Feb. 24, 1959
H. BLOEM ET AL
2,875,094
METHOD OF IMPREGNATING FIBRE MASSES WITH
A VISCOUS, HARDENABLE RESIN
INSOLUBLE IN WATER
Filed Nov. 16, 1953
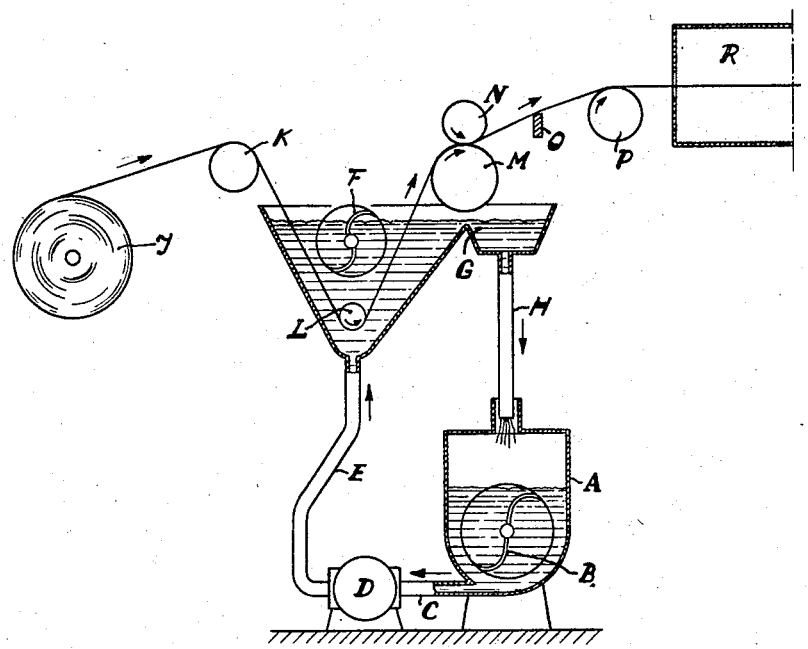
INVENTORS
HERMAN BLOEM
MARINUS STEL
BY
AGENT

United States Patent Office

2,875,094
Patented Feb. 24, 1959

2,875,094

METHOD OF IMPREGNATING FIBRE MASSES WITH A VISCOUS, HARDENABLE RESIN INSOLUBLE IN WATER

Herman Bloem and Marinus Stel, Eindhoven, Netherlands, assignors, by mesne assignments, to North American Philips Company, Inc., New York, N. Y., a corporation of Delaware Application November 16, 1953, Serial No. 392,210

Claims priority, application Netherlands November 14, 1952

7 Claims. (Cl. 117—115)

This invention relates to a method of producing a fibre mass impregnated with a heat-resistant condensate of the phenol-aldehyde type.

U. S. Patent No. 2,034,457 describes one method of the foregoing type employing as an impregnation liquid a stable emulsion of phenol-aldehyde resin pre-condensate in water. When a fibre mass is immersed in such as impregnation liquid, the individual fibres in the interior of the mass are enveloped in and soaked with the resin, which may presumably be due to the swelling of the fibre in the aqueous agent, so that after the pre-condensate has been hardened, not too much moisture is absorbed by the impregnated fibres. This method, however, suffers from the drawback that only a comparatively small quantity of resin pre-condensate can be absorbed by the fibre mass. Further, such pre-condensates cannot usually be worked to form a stable emulsion in water, and to attain stability in the method described in that patent, it is necessary to add substances to the emulsion which adversely affect the electrical properties of the final product, for example, lower the electric resistance, increase the dielectric losses etc.

The chief object of the invention is to provide a method for impregnating fiber masses with a heat-hardenable resin condensate of the phenol-aldehyde type in which the choice of resin employed is not limited to those that form stable aqueous emulsions.

A further object of the invention is to provide a method for impregnating fiber masses with large quantities of heat-hardenable resin condensates.

These and further objects of the invention will be best understood from the following description.

In accordance with the invention, it has been found that even unstable emulsions may frequently constitute suitable impregnation liquids, provided that the emulsion is prevented from settling by the step of maintaining motion in the impregnation liquid, i. e., agitating the liquid, for example, by means of a stirring device or by causing the liquid to circulate by pumping. Consequently, the choice of the phenol-aldehyde precondensate is less limited, since it is no longer necessary to use emulsions stabilized by particular operations or additions.

The degree of motion imparted to the impregnation liquid in accordance with the invention is determined by the speed with which the emulsion settles. That is to say, the motion of the emulsion in the impregnation bath must be performed in a manner such that no water is separated out, which would otherwise prevent a uniform impregnation and give the product a stained appearance. When the resin emulsion has penetrated into the interior of the fibre mass, the method of the invention is completed by removing the impregnated mass from the impregnation liquid, stripping off the adhering liquid, and removing the water absorbed by the fibre mass usually by evaporation, after which the pre-condensate is hardened.

It was further found from employing the method of the invention that a materially larger quantity of resin pre-condensate is absorbed by the fibre mass, so that a single impregnation operation may provide heavily impregnated fibre masses. For producing hard paper and hard tissue, which contain more than 40% by weight of phenol-aldehyde condensate, use is preferably made of an emulsion of which the pre-condensate content is at least 40% by weight. In this case, a single impregnation operation suffices. If the fibre mass should absorb smaller quantities, the emulsion may be diluted.

A phenol- or a cresol-aldehyde pre-condensate is very suitable for use in the method of the invention; this is obtained by causing ammonia or an amine to react on a mixture of phenol with an aldehyde, for example, formaldehyde. In such pre-condensates the ammonia or the amine is bound, so that an emulsion having a low content of electrolyte may be obtained, and the final product has favorable electric properties.

Since it is difficult to obtain a stable emulsion with the foregoing pre-condensates, the tendency for the phases to separate out in the emulsion being rather great, this tendency may be reduced, and the quality of the final product improved, by using an incorporated plasticizer, i. e. a compound bound chemically to the condensate molecules, and reducing the hardness of the final product. As a result, a less intensive motion need be imparted to the impregnation liquid; the final product is less hard and permits of being readily punched; and, moreover, some improvement in the electric properties of the final product is obtained. As a suitable plasticizer a fatty acid amide having more than 12 carbon atoms, for example, steryl amide has given satisfactory results. Additions of the plasticizer of 2 to 7% by weight of the quantity of phenol, provide these improvements. Other suitable plasticizers are amides of oleic acid, castor oil acids, linseed oil acids, etc.

The invention will now be described with reference to the accompanying drawing, which is a diagrammatic view of an apparatus for carrying out the method of the invention.

Referring to the drawing, a stock container A contains an emulsion produced by stirring by means of a tape-shaped stirring device B, of a phenol-aldehyde pre-condensate with water. The emulsion is forced through a duct C by means of a pump D into an impregnation bath E containing a tape stirring device F, from which the liquid is transferred via an overflow G and a duct H back to the stock container A. A roll of paper I furnishes a strip, which is moved via a guide roller K and an immersion roller L between dosation rollers M and N. After which, it is moved along a stripping-off device O and across a guide roller P to a drying furnace R, where the water absorbed in the impregnated paper is evaporated. Thereafter, the impregnated paper exiting from the furnace R is cut to a definite length, and a stack of such layers is united to form a unit in a heated press, owing to the hardening of the pre-condensate in the conventional manner.

An example illustrating the method of the invention is as follows: 1500 cc. of cresol 40/45, 1270 cc. of formaline 40%, 64 g. of sterylamide and 100 cc. of 25% ammonia were mixed and boiled for 15 minutes. Then, 500 cc. of water was distilled off in vacuo. It was found that such a mixture of resin and water produced an emulsion not settling down as long as it was slowly stirred. While the liquid had motion imparted thereto, a piece of paper was impregnated and passed between two glass rods, so that the adhering liquid was removed. Then the impregnated paper was dried for 10 minutes at 125° C., and the resin hardened in a press at 160° C. for 20 minutes. It was found that the paper had adsorbed a quantity of resin corresponding to 49% by weight of the dry impregnated paper. For the surface resistance and internal resistance of the impregnated paper, values higher than $10^{12}$ ohms were obtained (measured in accordance with the prescription VDE 0303–VII.40). After the impregnated paper had been left in water for 24 hours, these values had dropped to $3.10^{11}$ and $1.5.10^{11}$ ohms, respectively. For purposes of comparison, paper treated with an alcoholic solution (a prior art method) of this pre-condensate until a content of 45% of the impregnated paper had been absorbed exhibited resistances at the surface and on the interior which were also more than $10^{12}$ ohms. After immersion for 24 hours in water, these values had dropped to $2.10^8$ and $3.5.10^8$ ohms respectively, clearly demonstrating the advantages of the method of the invention.

In another embodiment of the invention a resin was prepared by boiling a mixture of 1060 g. of monohydroxybenzene, 1000 cc. of formaline 40% and 60 cc. of ammonia 25% in water during 12 minutes. After removal of 400 cc. of water a mixture was produced which needed more vigorous stirring to prevent the emulsified resin from settling down than the resin of the previous example. In this emulsion a piece of paper was impregnated and the impregnated paper was hardened as described hereinbefore. The quantity of resin absorbed by the paper corresponded to 48% and the surface resistance measured after the impregnated paper had been left in water for 24 hours corresponded to $6.10^{10}$ ohms.

The method of the invention affords a decided improvement over the method disclosed in U. S. Patent No. 2,034,457 in the following respects. Firstly, the method of the invention, which stabilizes an aqueous emulsion of a phenol-aldehyde resin by imparting motion thereto, obviates the necessity for incorporating substances therein which detrimentally affect the electrical properties of the final product. Secondly, the method of the invention enables the absorption by the fibre masses of materially greater quantities of the resin pre-condensate. Thirdly, it permits the use of resins in aqueous emulsions which are normally very difficult to stabilize by the heretofore known expedients, thereby making available to the art a greater variety of products. Finally, the electrical properties exhibited by products made in accordance with the invention are greatly improved in contrast to the heretofore known products, without involving the use of expensive or cumbersome apparatus, or more expensive ingredients.

Phenols suitable for the afore-described method are mono-hydroxy benzene, cresols and xylenols and mixtures of these phenols. The agents for reacting with the phenols to form the pre-condensates, which tend to be unstable as an aqueous emulsion, include aldehydes as formaldehyde and furfural.

While we have described our invention in connection with specific embodiments and applications, other modifications thereof will be readily apparent to those skilled in this art without departing from the spirit and scope of the invention as defined in the appended claims.

What is claimed is:

1. A method of producing a coherent fibre mass impregnated with a heat-resistant condensate of the phenol-aldehyde type, which comprises the steps of forming an impregnation liquid, substantially electrolyte free, comprising an unstable aqueous emulsion of a heat hardenable, water insoluble phenol-aldehyde pre-condensate formed by the reaction of a basic compound selected from the group consisting of ammonia and amines on a mixture of a phenol and an aldehyde in a manner such that substantially all of the basic compound is chemically bound to the resultant precondensate, agitating the liquid to prevent the precondensate from settling, immersing said fibre mass in said liquid while it is being agitated to impregnate the same, removing said impregnated fibre mass from said liquid, and hardening the pre-condensate present in the fibre mass.

2. A method as claimed in claim 1, in which the impregnation liquid is agitated by stirring the same.

3. A method as claimed in claim 1 in which the liquid is agitated by circulating the same.

4. A method as claimed in claim 1 in which the emulsion contains at least 45% by weight of the pre-condensate.

5. A method as claimed in claim 1 in which the pre-condensate contains a plasticizer.

6. A method as claimed in claim 5 in which the plasticizer is an amide of a fatty acid having more than 12 carbon atoms.

7. A method as claimed in claim 5 in which 2 to 7% by weight of plasticizer is used in proportion to the phenol quantity.

References Cited in the file of this patent

UNITED STATES PATENTS

| | | |
|---|---|---|
| 2,034,457 | Bender | Mar. 17, 1936 |
| 2,140,498 | Dreyer | Dec. 20, 1938 |
| 2,383,283 | Auxier et al. | Aug. 21, 1945 |
| 2,482,525 | Wachter | Sept. 20, 1949 |
| 2,565,152 | Wachter et al. | Aug. 21, 1951 |
| 2,649,758 | Cowgell | Aug. 26, 1953 |

FOREIGN PATENTS

| | | |
|---|---|---|
| 610,093 | Great Britain | Oct. 11, 1948 |
| 681,188 | Great Britain | Oct. 22, 1952 |